United States Patent [19]

Yamada

[11] Patent Number: 5,000,130

[45] Date of Patent: Mar. 19, 1991

[54] INTAKE SYSTEM FOR MULTI CYLINDER ENGINE

[75] Inventor: Tetsuro Yamada, Iwata, Japan

[73] Assignee: Yamaha Hatsudoki Kabushiki Kaisha, Iwata, Japan

[21] Appl. No.: 512,754

[22] Filed: Apr. 20, 1990

[30] Foreign Application Priority Data

Apr. 20, 1989 [JP] Japan .................. 1-101447

[51] Int. Cl.$^5$ ................. F02B 27/02; F02D 33/02
[52] U.S. Cl. ................ 123/52 MB; 123/586; 123/339
[58] Field of Search ......... 123/52 M, 52 MB, 52 MV, 123/585, 586, 587, 339

[56] References Cited

U.S. PATENT DOCUMENTS

| | | | |
|---|---|---|---|
| 4,423,706 | 1/1984 | Onodera | 123/52 MB |
| 4,425,887 | 1/1984 | Knapp et al. | 123/339 |
| 4,461,253 | 7/1984 | Kobashi et al. | 123/339 |
| 4,569,318 | 2/1986 | Fujimura et al. | 123/587 |
| 4,715,349 | 12/1987 | Hibino et al. | 123/585 |
| 4,765,285 | 8/1988 | Kobayashi | 123/52 MB |

Primary Examiner—Andrew M. Dolinar
Assistant Examiner—Thomas N. Moulis
Attorney, Agent, or Firm—Ernest A. Beutler

[57] ABSTRACT

A number of embodiments of induction systems for internal combustion engines having plural combustion chambers with each being served by an intake passage having a respective throttle valve. First and second plenum chambers communicate with the intake passage through relatively long and relatively short conduits for improving low and high speed running. A pressure regulating chamber is also provided. This communicates with all of the intake passages between the throttle valve and the combustion chamber. A first control valve is provided in each of the communicating passageways for controlling the communication of the pressure regulating chamber with the intake passage. A second conduit interconnects the pressure regulating chamber only with one of the intake passages upstream of the throttle valve and a second control valve controls the flow through this conduit. Various control strategies and geometric relationships are disclosed.

15 Claims, 10 Drawing Sheets

INTAKE SYSTEM FOR MULTI CYLINDER ENGINE

BACKGROUND OF THE INVENTION

This invention relates to an intake system for a multi cylinder engine and more particularly to an improved induction system that improves low speed running performance and also which does not sacrifice high speed performance or running in the midranges.

One form of induction system for an internal combustion engine that has particularly advantageous high speed performance employs a separate intake passage for each combustion chamber of the engine with a throttle valve that is positioned relatively close to the combustion chamber for controlling the flow through the respective induction passage. With such an arrangement, it has been proposed to provide a pressure regulating tank that communicates with the induction passages between the throttle valve and the combustion chamber and which incorporates a control valve that controls the communication of the pressure regulating tank with the induction passages In such a system, the opening of the control valves is increased during low speed operation when the throttle valve opening is small, particularly at idling, so that each intake passage communicates with the pressure regulating tank so as to reduce pressure fluctuations and variations in mixture concentration within the intake passage. This has been found to stabilize combustion and improve low speed running. To avoid deterioration and high speed output, it has been proposed to reduce the opening of the control valve under high speed operation, thus improving the responsiveness of the throttle control of the engine.

Another form of device has employed a bypass passage that communicates the intake passages with each other across the throttle valve and in which a control valve is positioned so as to control the idle speed by varying the opening of the control valve at such times as when the throttle valve is closed or in its idling position.

Although the aforenoted constructions can improve engine performance, the number of the passages employed and the sequences of opening and closing of the valves in them can be critical of engine performance and also can add significantly to the cost of the induction system.

It is, therefore, a principal object of this invention to provide an improved induction system for an internal combustion engine.

It is another object of this invention to provide an induction system for an internal combustion engine that employs a bypass system for the throttle valve of the induction passage and which will improve running at low speeds and will not deteriorate high speed performance.

It is a further object of this invention to provide such a control system for a multiple valve engine wherein the arrangement can be generally simplified.

SUMMARY OF THE INVENTION

This invention is adapted to be embodied in an induction system for an internal combustion engine having a combustion chamber and an intake passage that serves the combustion chamber. A throttle valve is provided for controlling the flow through intake passage. A pressure regulating chamber is connected by means of a first conduit to the intake passage between the throttle valve and the combustion chamber. A first control valve controls the flow through the first conduit. This first control valve is opened when the throttle valve is in a low speed condition. A second conduit interconnects the pressure regulating chamber with the intake passage upstream of the throttle valve and a second control valve in this second conduit controls the flow therethrough. Means are provided for controlling the position of the second control valve in response to the position of the throttle valve.

DETAILED DESCRIPTION OF THE PREFERRED EMBODIMENTS OF THE INVENTION

Figure 1:
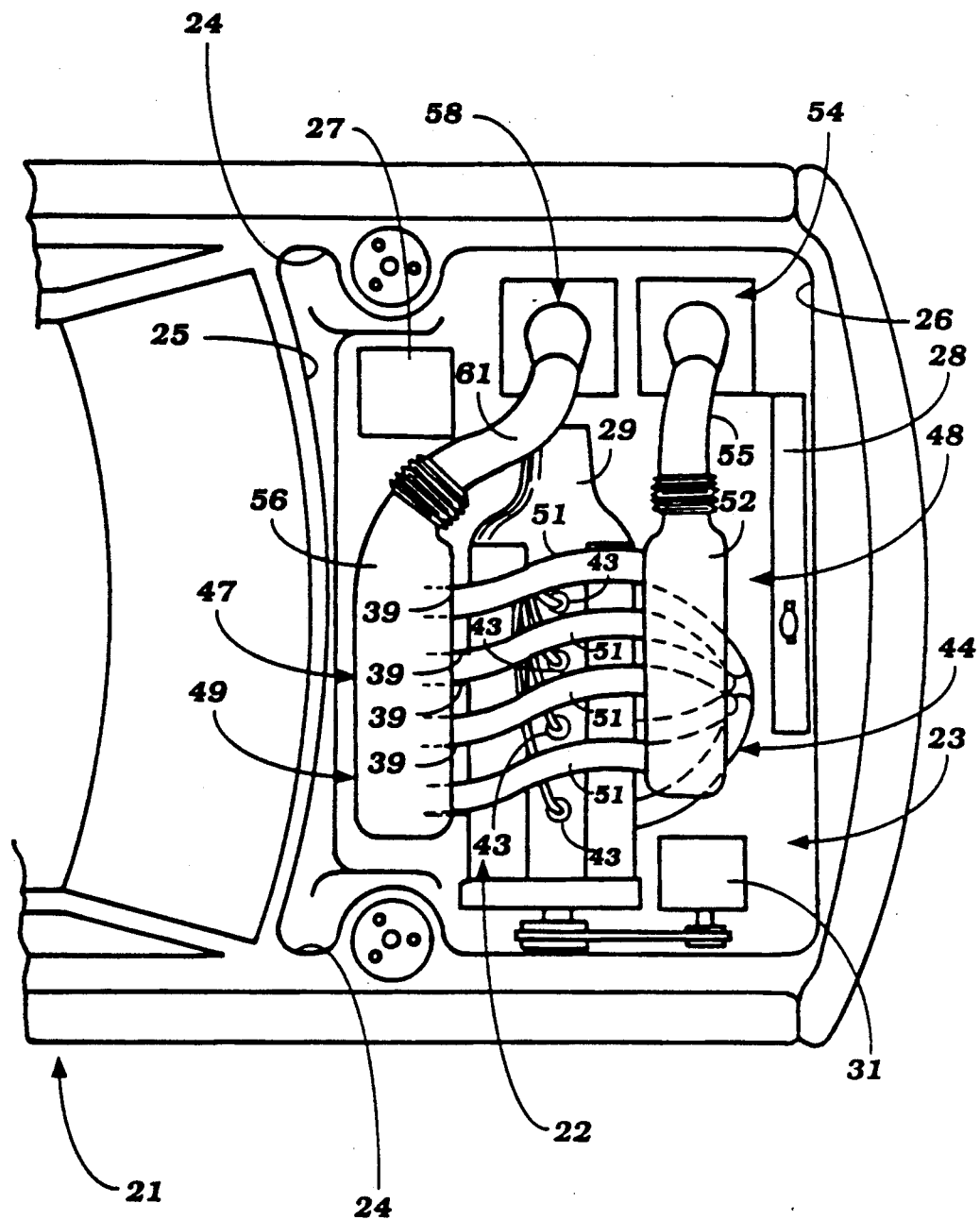
FIG. 1 is a top plan view of the engine compartment of a motor vehicle powered by an internal combustion engine having an induction system constructed in accordance with an embodiment of the invention.

Referring first to FIG. 1, a portion of a motor vehicle is identified generally by the reference numeral 21. Since the invention relates to an internal combustion engine 22 of the vehicle 21, only the engine compartment portion is shown in top plan view with the hood removed. In the illustrated embodiment, the engine 22 is positioned transversely in the engine compartment 23 defined by the front fender aprons 24, fire wall 25 and grill opening 26. It is to be understood that the invention can be utilized in conjunction with other engine layouts including transverse rear engine, rear wheel drives or fore and aft engine placement. However, the invention does have particular utility in an engine compartment layout of the type depicted.

The engine 22 is, in the illustrated embodiment, of the four cylinder in line type having twin overhead camshafts. Again, however, it should be readily apparent to those skilled in the art that the invention can be utilized in conjunction with other types of engines including rotary engines, engines having other cylinder numbers and other cylinder placement.

Also positioned in the engine compartment 23 to the rear of the engine 22 is a battery 27. A radiator 28 is positioned rearwardly of the grill opening 26 and is associated with the cooling system of the engine in a known manner.

The engine 22 drives a transmission 29 in a known manner for powering the front wheels (not shown) of the vehicle 21. A number of accessories are also driven by the engine 22 including an alternator 31.

The invention relates primarily to the induction system for the engine 22. For that reason, detailed description of the internal components of the engine 22 is not necessary to understand the construction and operation of the induction system. However, in FIG. 2, a portion of the engine is depicted and will be described so as to assist those skilled in the art to understand the construction and operation of the induction system.

The engine 22 includes a cylinder block 32 in which cylinder bores 33 are formed. As already noted, the depicted embodiment comprises a four cylinder in line engine. For that reason there are four cylinder bores 33 that are disposed transversely across the engine compartment 23. Pistons 34 reciprocate in each of the cylinder bores 33 and are connected by means of connecting rods 35 to drive a crankshaft (not shown) in a known manner.

A cylinder head 36 is affixed in an appropriate manner to the cylinder block 32 and has recesses 37 that cooperate with the pistons 34 and cylinder bores 33 to define the combustion chambers. One or more intake valves 38 are supported within the cylinder head 36 for each combustion chamber 37 and control the flow of charge to the combustion chambers 37 through an induction system that includes a main intake passage 39.

In the illustrated embodiment, there is one intake passage 39 for each combustion chamber 37, although it will be readily apparent to those skilled in the art how the invention can be practiced in conjunction with other numbers of intake passages for each combustion chamber. A manually operated throttle valve 41 is positioned in each intake passage 39 and the throttle valves 41 associated with the respective cylinder bores 43 are all linked together and operated by a remotely positioned operator contained within the passenger compartment of the vehicle 21 in a known manner. In addition, a fuel injection nozzle 42 is provided in each intake passage 39 downstream of the throttle valve 41 and is supplied with fuel under the control of a CPU 43.

The charge which is admitted to the combustion chambers 37 is fired by means of a respective spark plug 43 (FIG. 1). The burnt charge is discharged through an exhaust system, indicated generally by the reference numeral 44 that includes an exhaust manifold having individual exhaust pipes 45 that extend from the cylinder head exhaust passages. Exhaust valves 46 are supported in the cylinder head 36 for controlling the communication of the combustion chamber 37 with the exhaust manifold 45. As with the intake valves 38, there may be provided one or more exhaust valves 46 for each combustion chamber. The intake and exhaust valves 38 and 46 are operated by means of overhead camshafts. As has been previously noted, since the internal construction of the engine forms no portion of the invention, further description of it is believed to be unnecessary.

The engine induction system is indicated generally by the reference numeral 47 and includes a low speed portion 48 and a high speed portion 49, each of which terminate in a common portion consisting of the induction passage 39 for each combustion chamber 37. As will become apparent, the low and high speed induction passages 48 and 49 are each tuned to serve the high and low speed running characteristics of the engine so as to provide good running under all conditions.

Figure 4:
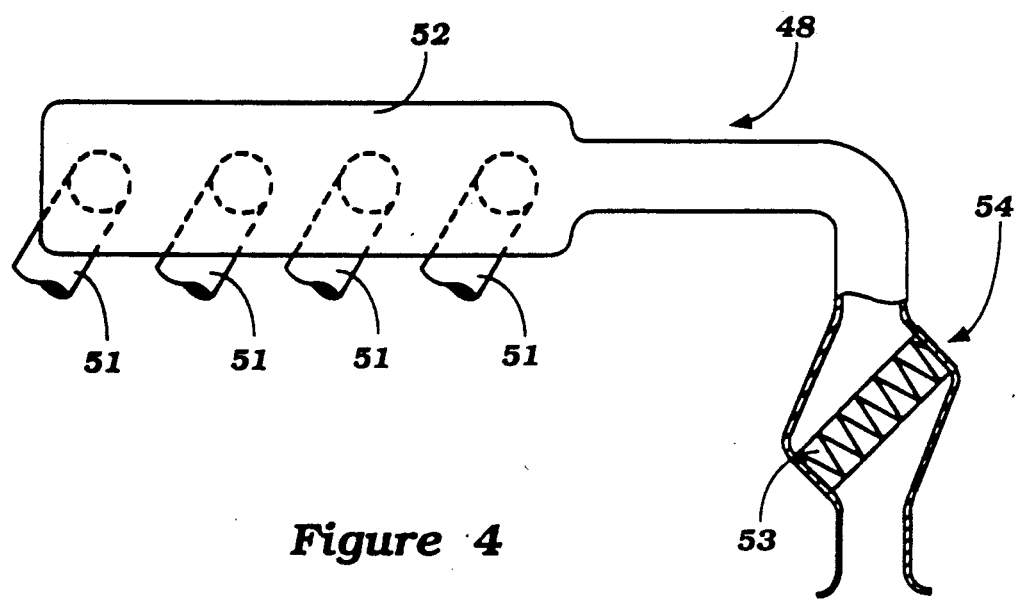
FIG. 4 is a schematic view showing the low speed induction system.

It will be noted that the intake passages 39 have a reentrant or reversely bent portion 51 that extends back across the cylinder head assembly 36 from the intake or rear side of the engine toward the exhaust or front side of the engine. These portions all merge into a common plenum chamber 52. The volume of the plenum chamber 52 and length of the passages 51 and 39 together are chosen so as to provide good tuning for low speed running. Atmospheric air is delivered to the plenum chamber 52 through an air inlet device that includes an air filter 53 and a silencing and inlet box 54. A short connecting passageway 55 interconnects the inlet box 54 with the plenum chamber 52. This low speed induction system 48 is also shown schematically in FIG. 4.

Figure 2:
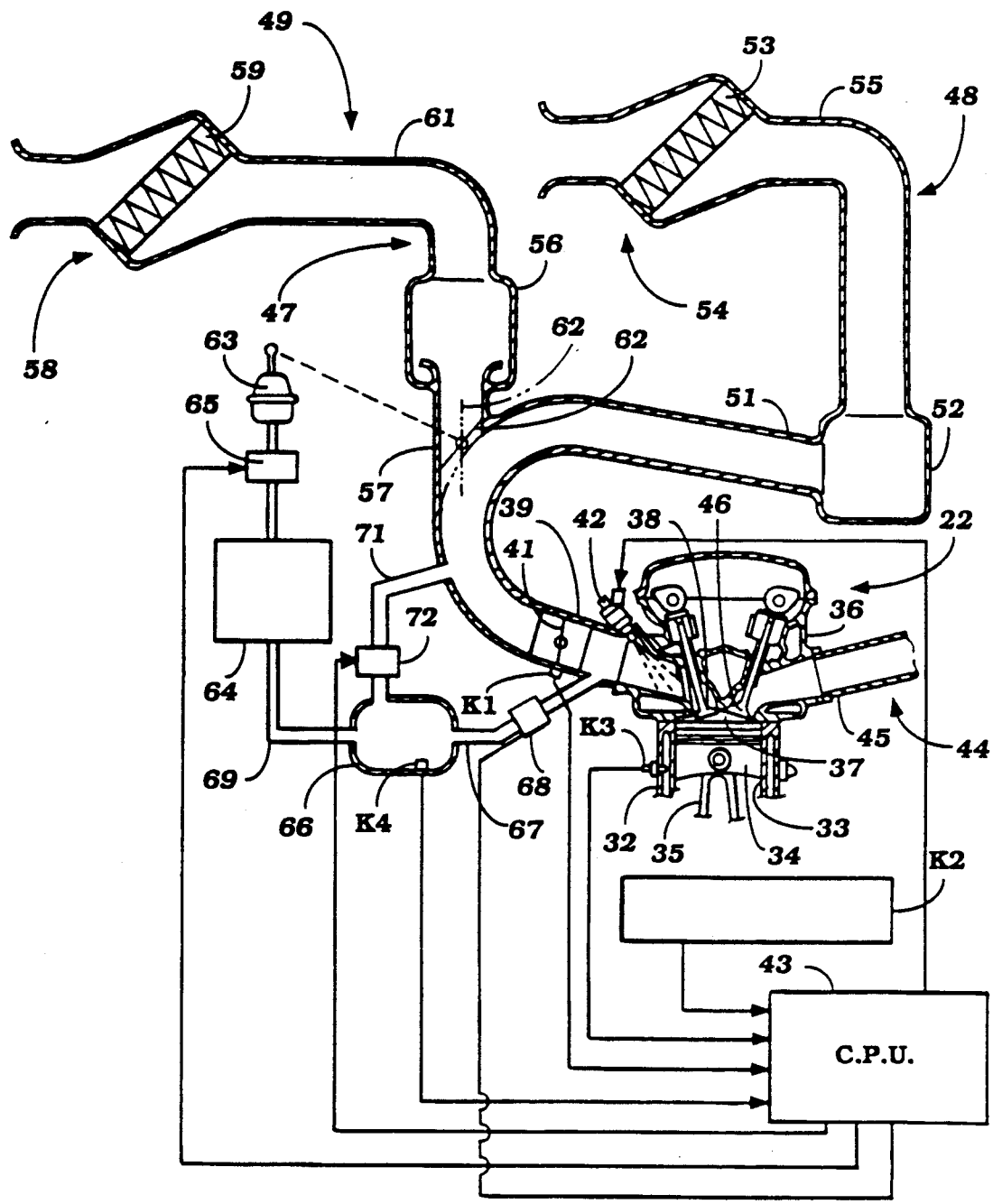
FIG. 2 is a partial cross sectional view, with certain components shown schematically, of the induction system and its relationship to the engine.
Figure 3:
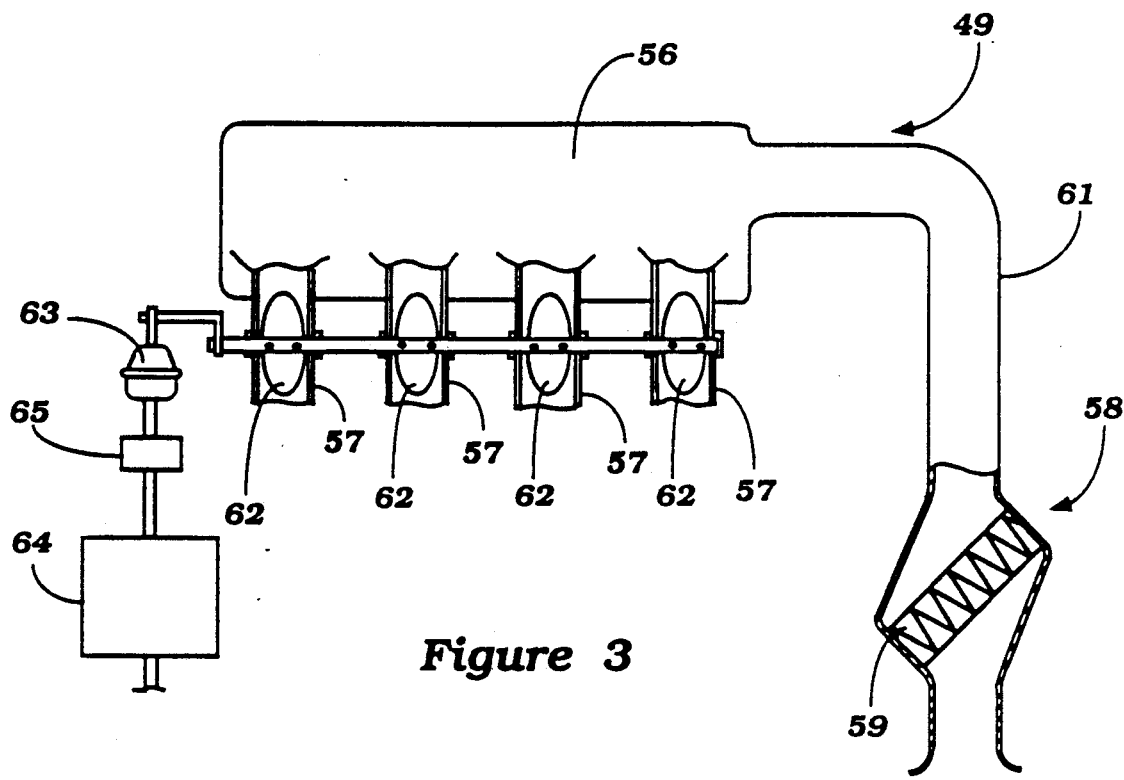
FIG. 3 is a schematic view showing the high speed induction system portion and the control throttle valves associated with it.

The high speed induction system 49 is shown schematically in FIGS. 2 and 3 and includes a second plenum chamber 56 that lies generally over the inlet side of the engine and which communicates with the common intake portions 39 through relatively short runners 57. The length of the high speed intake passage between the intake valve 38 and the plenum chamber 56 including the common portion 39 and short connecting passageways 57 and the volume of the plenum chamber 56 may be tuned to improve high speed running. Atmospheric air is supplied to the plenum chamber 56 from an air inlet box 58 that includes an air filter element 59 and is provided through a short connecting pipe 61.

In order to insure that the high speed intake system 48 operates only at high speed conditions, a throttle control valve 62 is positioned in each connecting passageway 57 adjacent its intersection with the common passageway 39. The throttle valves 62 are all affixed together on a common throttle valve shaft and are operated in a manner to be described. When the throttle valves 62 are closed as shown in the solid line view in FIG. 2, they in effect form an extension of the wall of the passageway 39 and hence offer no obstruction to flow. However, when the throttle valves 62 are opened as shown in the phantom line view, they will protrude slightly into the common portion but will not interfere with the flow due to the fact that flow is primarily through the short connecting pipes 57 rather than through this common portion where the curvature occurs.

The common shaft to which the throttle valves 62 are affixed is connected to a vacuum motor 63 which is selectively connected to a source of vacuum 64 or an atmospheric vent by means of a switch valve 65. The switch valve 65 is operated by the CPU 43 so as to hold the throttle valves 62 in their closed position during low and midrange running and to open them as the engine approaches its high speed condition. As a result, the low speed induction system 48 will supply the primary charge requirements for the engine during low and midrange performance while the high speed portion 49 will serve the high speed running. Thus, the compound induction system provides good running through the entire engine load and speed ranges.

Figure 5:
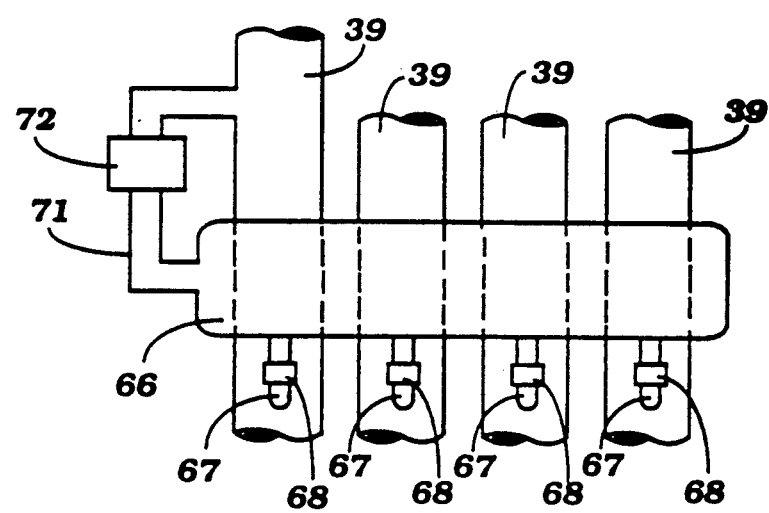
FIG. 5 is a top plan view showing the relationship between the pressure regulating chamber and the various intake passages of this embodiment.

Although the induction system as thus far described improves performance throughout the entire engine load and speed ranges, the use of the individual throttle valves 41 and their close positioning to the combustion chambers 37 tends to cause a condition which might result in uneven or rough running at low speed. The reason for this is that the throttle valves 41 are opened only a very small extent under this running condition. There can be pressure fluctuations and variation in mixture distribution in the intake passages 39 and combustion chambers 37 under these conditions. To avoid this condition, there is provided a pressure regulating tank, indicated generally by the reference numeral 66 which acts like an accumulator or further plenum chamber. This pressure regulating tank 66 extends along the intake side of the engine under the common intake portions 39 as best shown in FIG. 5 and communicates with the common portions 39 between the throttle valves 41 and combustion chambers 37 through individual first conduits 67. The conduits 67 have positioned within them first control valves 68 which are operated by the CPU 43 in response to a strategy which generally causes the valves 68 to be opened when the throttle valves 41 are closed or only partially opened and which closes the control valve 69 under high speed running.

The pressure regulator 66 also serves the source of vacuum for the vacuum device 64 through a conduit 69.

Although the aforedescribed construction will provide good running under low speed conditions, it is desirable to insure that there is a good source of air for the pressure regulating chambers 66 and also so that high speed running will not be deteriorated and so that the throttle valves 41 can provide good control. In accordance with the invention, a single second conduit 71 extends from the pressure regulating chamber 66 to one of the intake passages 39. In the illustrated embodiment, this connection is to the intake passage 39 at the front or one end of the engine although other arrangements are obviously possible A second control valve 72 is provided in this passage 71. This control valve 72 is also controlled by the CPU 43. Generally, the control valve 72 is held open at low engine speeds and low openings of the throttle valve 41 and is closed when the throttle valve is opened toward its full throttle position.

The engine 22 is instrumented with a number of sensors that supply information to the CPU 43 for operation of the various control valves described. That is, specifically the operation of the control valves 68 and 72 and the switching valve 65 that controls the throttle valves 62. These sensors include a throttle position sensor K1 that senses the position of the throttle valves 41, an engine speed sensor K2 that senses the rotational speed of the engine, an engine temperature sensor K3, and a pressure or air flow sensor K4 that is provided in the pressure regulating tank 66. The sensor K4 actually will obtain a reading indicative of air flow amount because of the vacuum existing in it and thus dispenses with the necessity of using an air flow meter of the type which might interfere with the ability of the engine to induct air, particularly at low speeds. Also, since there are two atmospheric air inlets, one for each of the low speed induction system 48 and high speed induction system 49, the use of the single sensor K4 would eliminate the need for two sensors and an addition circuit. The sensor K4 can be positioned anywhere in the common induction portion 39 but the positioning in the pressure regulating tank 66 is particularly advantageous.

Considering now the running condition, when the engine is being operated at low speeds and low loads with the throttle valves 41 basically closed, the CPU 43 will close the throttle valves 62 so that the low speed induction system 47 supplies the induction air for the engine. As has been previously noted, this improves the low speed running due to the special tuning of this induction passage.

Under this condition, the control valve 68 is opened and the intake passages 39 all communicate with the pressure regulating chamber 66 so as to reduce pressure fluctuations and to average the mixture concentration in the intake system. When this condition occurs, the valve 72 is also opened so as to provide air to the pressure regulating tank 66 to achieve the desired idle speed and maintain idle speed constant In addition, the valve 72 can be opened at lower temperatures so as to provide more stable running.

As the throttle valves 41 are opened and the engine speed and load increases, the control valves 68 are closed. The control valves 72 are also closed, although these closings need not be directly proportional to each other so as to improve the running. As the throttle valves 41 are further opened, the valves 68 and 72 will be fully closed and the throttle valve 62 will eventually be opened so as to provide good high speed running.

Figure 6:
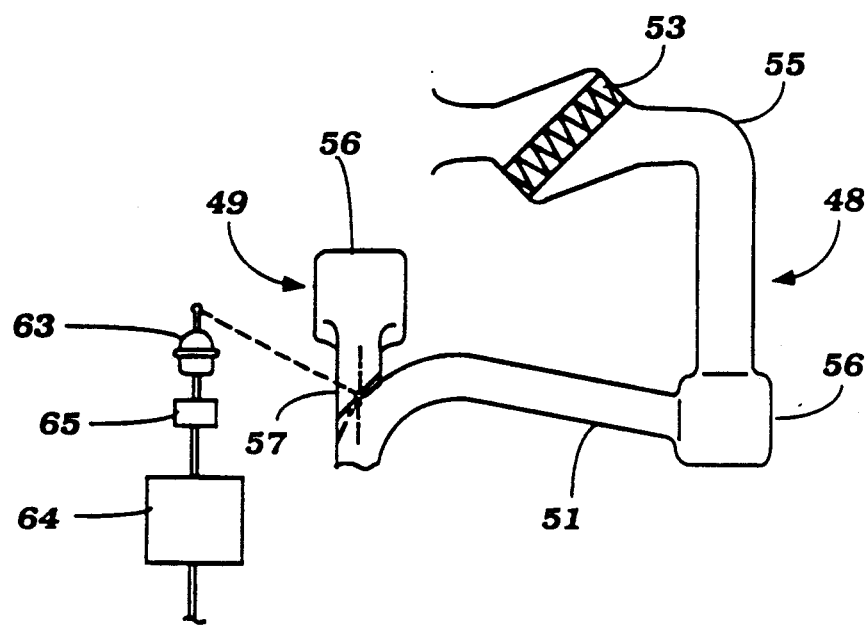
FIGS. 6 through 16 are partial cross sectional views, in part similar to FIG. 2, each showing a different additional embodiment of the invention.

In the embodiment of the invention as thus far described, the high speed plenum chamber 56 and low speed plenum chamber 52 was each provided with its own respective atmospheric air inlet. FIG. 6 shows another embodiment of the invention which is generally the same. For that reason, components which are the same have been identified by the same reference numerals. In this embodiment, however, the high speed induction plenum chamber 56 does not have a separate atmospheric air inlet. Rather, atmospheric air can be delivered to this plenum chamber 56 through the throttle valves 62 when they are open from the runners 51 serving another combustion chamber which is not at that instant on its induction cycle. That is, in this embodiment, atmospheric air is delivered from the inlet device 54 to the plenum chamber 56 through the throttle valve 62 when they are opened. This construction provides a simplification of the overall construction.

Figure 7:
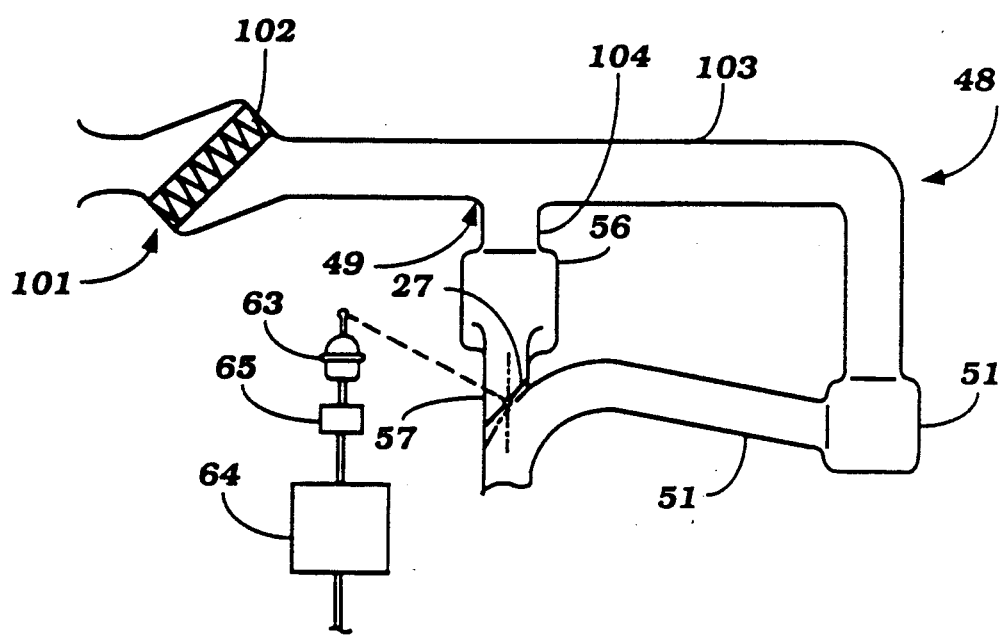

In the construction shown in the embodiment of FIG. 6, the induction system is simplified because there is only one atmospheric air inlet provided for both plenum chambers. However, the arrangement can somewhat restrict air flow. FIG. 7 shows another embodiment that is generally similar but which provides a single air intake device, indicated generally by the reference numeral 101 in which an air filter element 102 is provided. A first conduit 103 interconnects the air inlet device 101 with the high speed plenum chamber 51 while a second conduit 104 interconnects the high speed plenum chamber 56 with this air inlet device. In all other regards, this embodiment is the same as that previously described. For that reason, further description is not necessary and common components have been identified by the same reference numerals.

Figure 8:
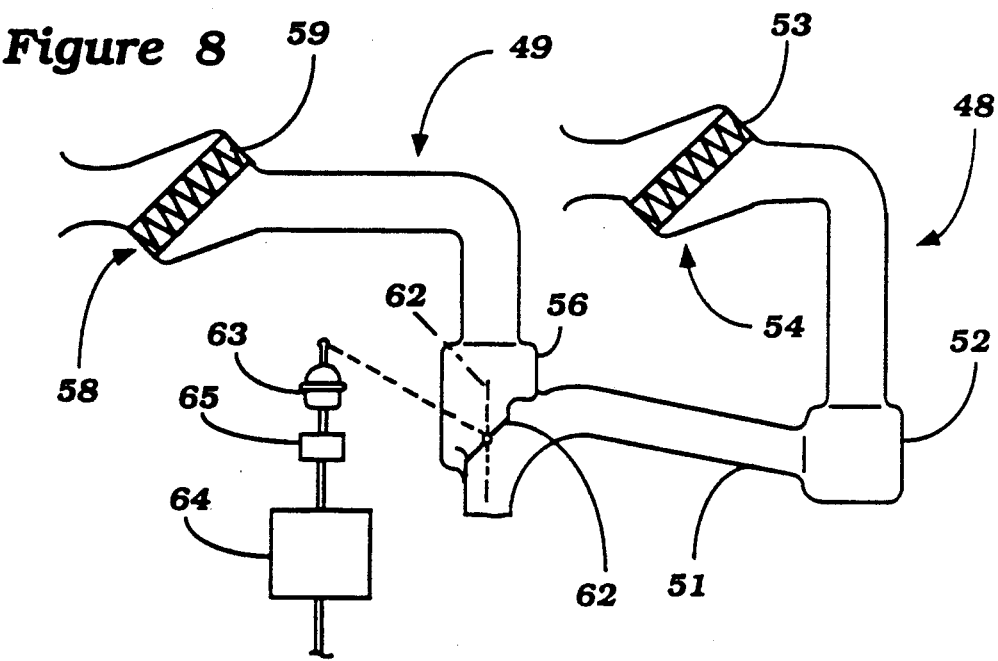
Figure 9:
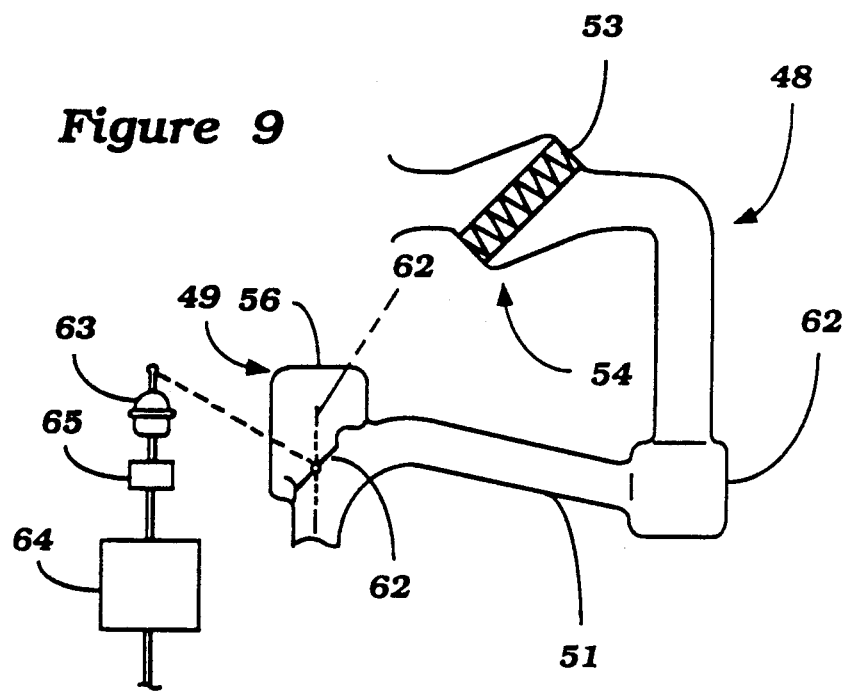
Figure 10:
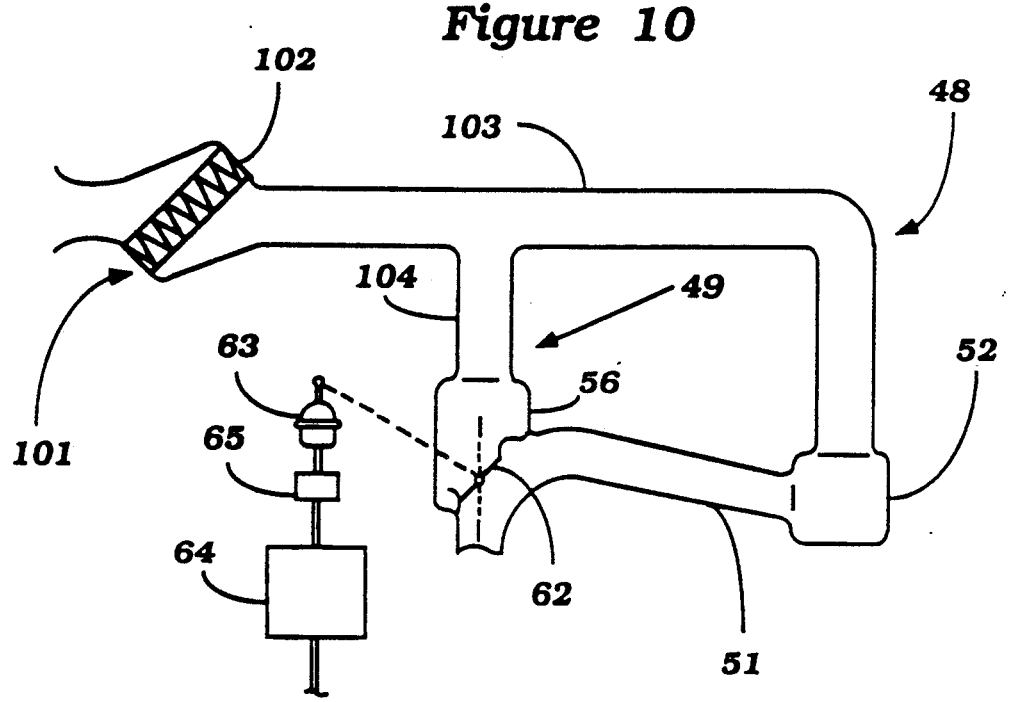

In all of the embodiments as thus far described, the high speed plenum chamber 56 has been interconnected with the common intake passages 39 through short runners 57. FIGS. 8, 9 and 10 show, respectively, arrangements wherein the high speed plenum chamber 56 extends tangentially to the common portion 39 and thus avoids the use of short connecting passageways. FIGS. 8, 9 and 10 show air inlet arrangements for the high speed plenum chamber 56 corresponding to FIGS. 2, 6 and 7, respectively. For that reason, components which are the same in this embodiment as those embodiments have been identified by the same reference numerals.

In the embodiments as thus far described, the throttle valves 62 were of the butterfly type and generally when they were in their opened positions did not restrict the communication of the low speed induction system 41 with the common intake portions 39. However, it maY be desirable to provide an arrangement wherein communication of the low speed induction system 48 with the combustion chambers is substantially precluded when the high speed induction system 49 is serving the combustion chambers of the engine.

Figure 11:
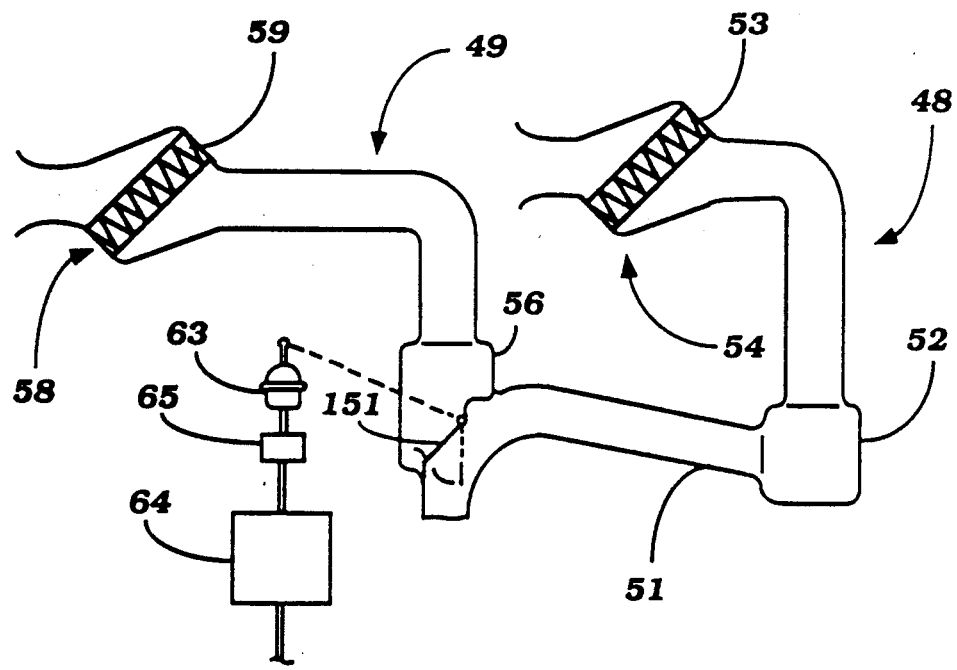
Figure 12:
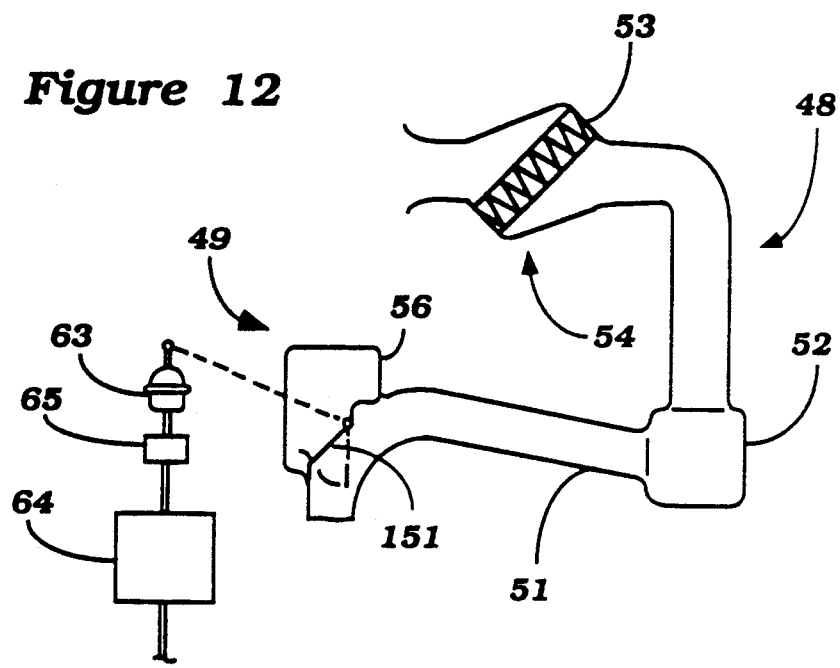
Figure 13:
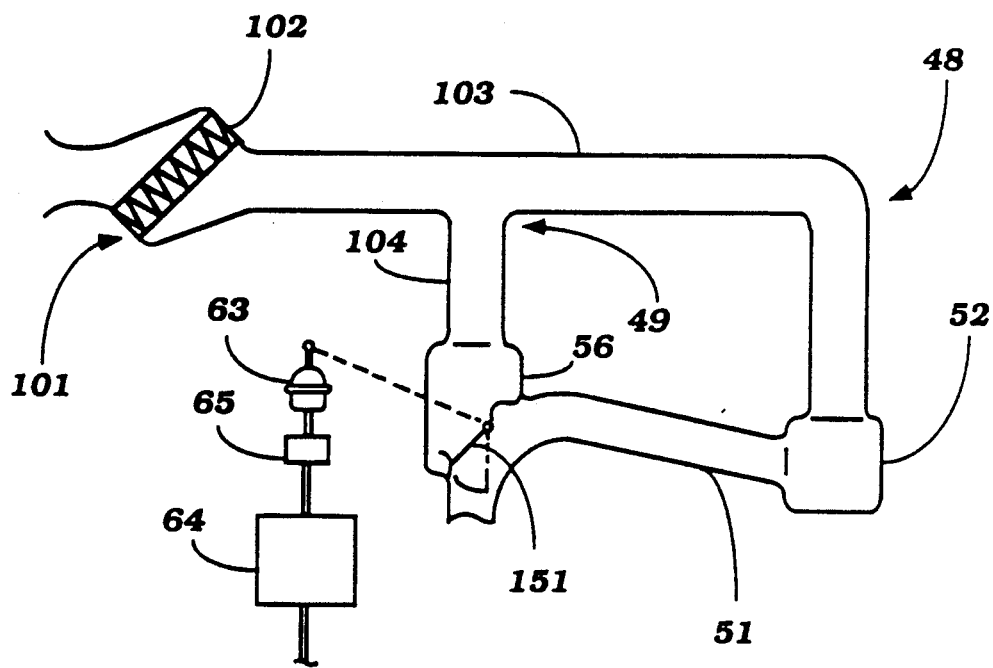

FIGS. 11 through 13 show embodiments of the invention wherein this is achieved through induction systems of the type generally shown in FIGS. 8 through 10. For that reason, these induction systems have employed like reference numerals to indicate like components of the embodiments of FIGS. 8 through 10. It should be noted that in each of these embodiments, the butterfly type throttle valves 62 are replaced by a flapper type throttle valve 151 that is pivoted for movement about an axis that lies on the outer periphery of the curved portion of the common induction passages 39 As a result, when the throttle valves 151 are in their opened position, as shown in the phantom lines, they will substantially close off the runners 51 and only the high speed induction systems 49 will supply the engine.

Figure 14:
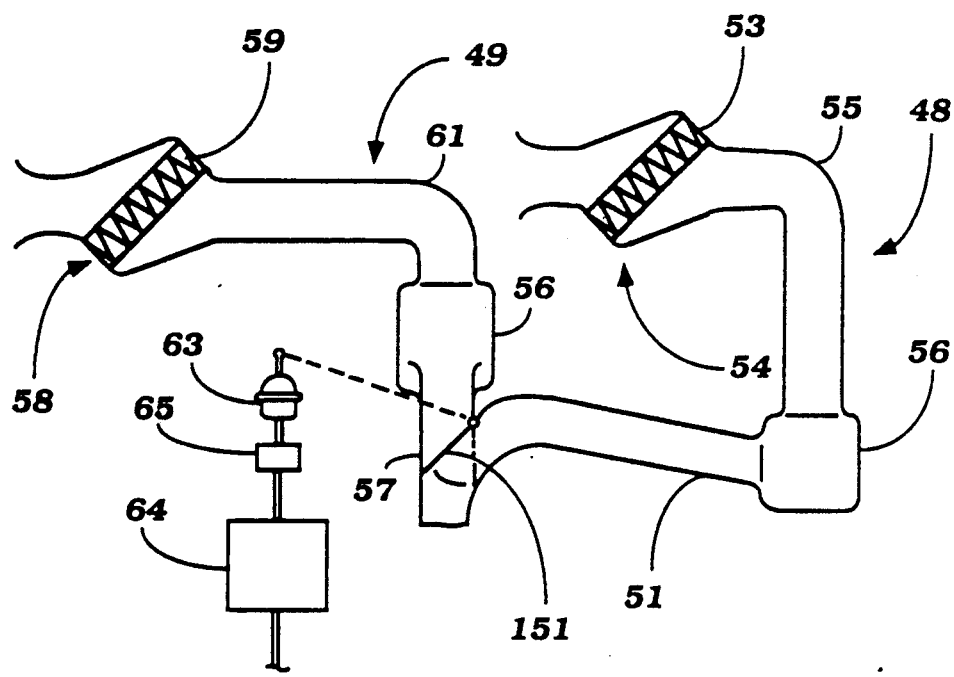
Figure 15:
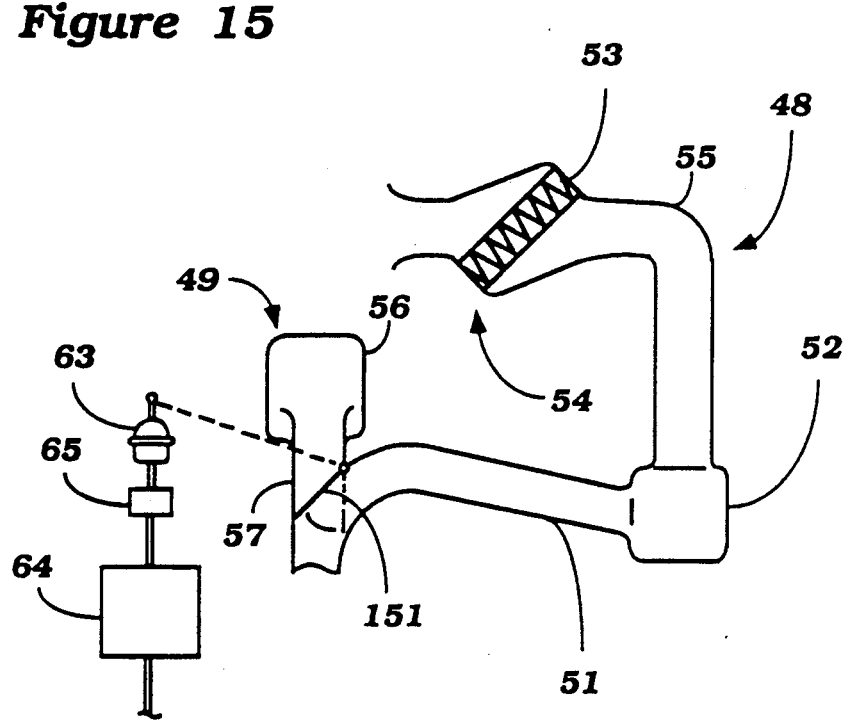
Figure 16:
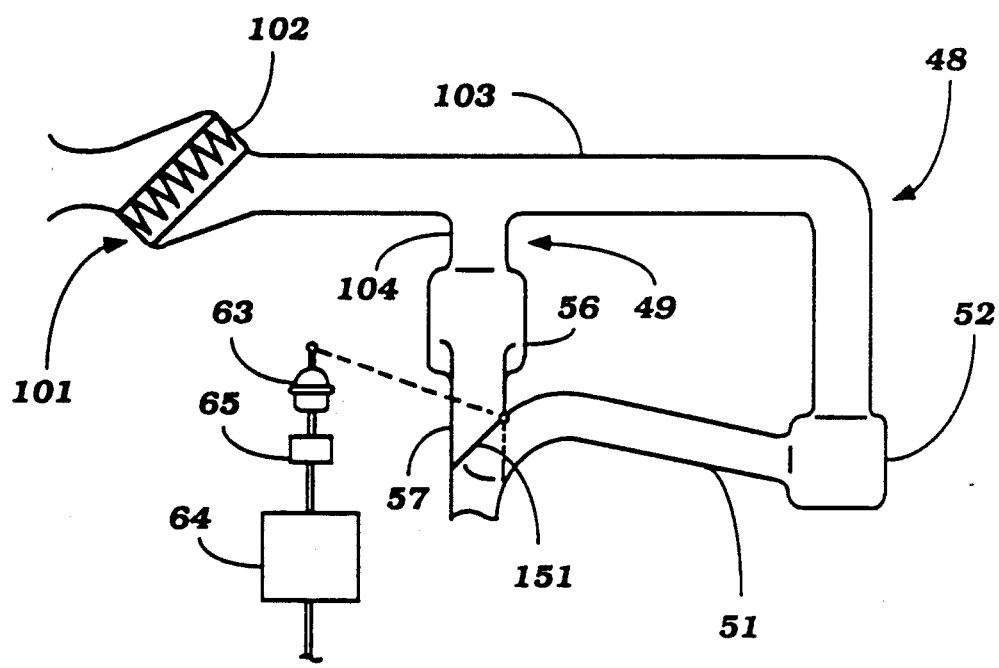

FIGS. 14 through 16 show the use of flapper type throttle valves 151 of the type employed in the embodiments of FIGS. 11 through 13 in conjunction with induction systems of the type shown in FIGS. 2, 6 and 7 respectively wherein there are short connecting passageways 57 between the high speed plenum chambers 56 and the common induction system. Because of the other similarities, the same components in these embodiments have been identified by the same reference numerals. Further description of them is believed to be unnecessary.

It should be readily apparent from the foregoing description that a number of embodiments of high performance induction systems have been disclosed, each of which is effective in improving the engine performance throughout all running conditions including idle and off idle. In addition, each running condition is improved without sacrificing or adversely effecting other running conditions. Although a number of embodiments of the invention have been illustrated and described, various changes and modifications may be made without departing from the spirit and scope of the invention, as defined by the appended claims.

I claim:

1. An induction system for an internal combustion engine having a combustion chamber, an intake passage serving said combustion chamber, a throttle valve for controlling the flow through said intake passage, a pressure regulating chamber, first conduit means extending from said pressure regulating chamber to said intake passage between said throttle valve and said combustion chamber, first control valve means for controlling the flow through said first conduit means, means for opening said first control means when said throttle valve is in a low speed condition, second conduit means interconnecting said intake passage upstream of said throttle valve with said pressure regulating chamber, second control valve means in said second conduit means for controlling the flow therethrough, and means for controlling the position of said second control valve means in response to the position of said throttle valve.

2. An induction system as set forth in claim 1 further including means providing an atmospheric air source to the pressure regulating chamber through the second conduit means.

3. An induction system as set forth in claim 2 wherein the atmospheric air inlet is provided by an atmospheric air inlet to the pressure regulating chamber from the intake passage.

4. An induction system as set forth in claim 3 further including a plurality of combustion chambers and intake passages, each of said plurality of intake passages communicating with the pressure regulating chamber through respective first conduit means.

5. An induction system as set forth in claim 4 wherein there is only one second conduit means interconnecting the pressure regulating chamber with only one of the intake passages.

6. An induction system as set forth in claim 1 further including a first plenum chamber communicating with the intake passage through a relatively long passage for improving low speed running and a second plenum chamber communicating with the intake passage through a relatively short induction system for improving high speed running.

7. An induction system as set forth in claim 6 further including a second throttle valve for controlling the communication of the second plenum chamber with the intake passage and means responsive to an engine running condition for controlling the throttle valve.

8. An induction system as set forth in claim 7 further including means providing an atmospheric air source to the pressure regulating chamber through the second conduit means.

9. An induction system as set forth in claim 8 wherein the atmospheric air inlet is provided by an atmospheric air inlet to the pressure regulating chamber from the intake passage.

10. An induction system as set forth in claim 9 further including a plurality of combustion chambers and intake passages, each of said plurality of intake passages communicating with the pressure regulating chamber through respective first conduit means.

11. An induction system as set forth in claim 10 wherein there is only one second conduit means interconnecting the pressure regulating chamber with only one of the intake passages.

12. An induction system as set forth in claim 11 wherein the first and second plenum chambers are each provided with respective atmospheric air inlets each communicating directly with the atmosphere.

13. An induction system as set forth in claim 11 wherein the first and second plenum chambers are supplied with a common atmospheric air inlet.

14. An induction system set forth in claim 13 wherein the common atmospheric air inlet supplies atmospheric air to the first plenum chamber and the second plenum chamber receives atmospheric air from the first plenum chamber through the relatively long passage.

15. An induction system as set forth in claim 13 wherein the common atmospheric air inlet has a first path communicating with the first plenum chamber and a second path communicating with the second plenum chamber.

* * * * *